United States Patent
Yoshizawa et al.

(10) Patent No.: US 11,719,824 B2
(45) Date of Patent: Aug. 8, 2023

(54) DISTANCE MEASURING DEVICE, CONTROL METHOD OF DISTANCE MEASURING DEVICE, AND CONTROL PROGRAM OF DISTANCE MEASURING DEVICE

(71) Applicant: Konica Minolta, Inc., Tokyo (JP)

(72) Inventors: Masanori Yoshizawa, Tokyo (JP); Hideki Morita, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 267 days.

(21) Appl. No.: 16/771,760

(22) PCT Filed: Aug. 28, 2018

(86) PCT No.: PCT/JP2018/031797
§ 371 (c)(1),
(2) Date: Jun. 11, 2020

(87) PCT Pub. No.: WO2019/116641
PCT Pub. Date: Jun. 20, 2019

(65) Prior Publication Data
US 2021/0072395 A1 Mar. 11, 2021

(30) Foreign Application Priority Data
Dec. 15, 2017 (JP) .................................. 2017-240435

(51) Int. Cl.
*G01S 7/28* (2006.01)
*G01S 17/894* (2020.01)
(Continued)

(52) U.S. Cl.
CPC ............ *G01S 17/894* (2020.01); *G01S 7/486* (2013.01); *G01S 7/4814* (2013.01); *G01S 17/931* (2020.01)

(58) Field of Classification Search
CPC . G01S 17/88; G01S 17/06; G01S 5/02; G01S 7/41; G01S 7/40; G01S 19/51;
(Continued)

(56) References Cited

U.S. PATENT DOCUMENTS

2011/0246116 A1* 10/2011 Kamitani ................. G01C 3/00
702/159

FOREIGN PATENT DOCUMENTS

JP 2010-256198 A 11/2010
JP 2011-215005 A 10/2011
(Continued)

OTHER PUBLICATIONS

International Search Report and Written Opinion issued in PCT/JP2018/031797 dated Nov. 27, 2018.
(Continued)

*Primary Examiner* — Tu X Nguyen
(74) *Attorney, Agent, or Firm* — BakerHostetler

(57) ABSTRACT

The present invention is to provide a distance measuring device capable of distinguishing between a reflection from fog or the like and a reflection from an actually existing object in an environment such as fog.

The invention is a distance measuring device including a light-emitting element 12 that transmits a signal, a light-receiving element 15 that receives a signal transmitted by the light-emitting element 12 and reflected by an object, and outputs a reception signal corresponding to a received signal strength, a comparator 19 that outputs a first signal equal to or greater than a first threshold value with respect to signal strength and a second signal equal to or greater than a second threshold value higher than the first threshold value from the reception signal, and a signal processing unit 10 that distinguishes the reception signal as valid or invalid or not from a relationship between a first time span from when the first
(Continued)

signal becomes equal to or greater than the first threshold value until the first signal becomes less than the first threshold value and a second time span from when the second signal becomes equal to or greater than the second threshold value until the second signal becomes less than the second threshold value.

17 Claims, 8 Drawing Sheets

(51) Int. Cl.
  *G01S 17/931* (2020.01)
  *G01S 7/481* (2006.01)
  *G01S 7/486* (2020.01)

(58) Field of Classification Search
  CPC .......... G01S 7/292; G01S 7/483; G01S 11/06; G01S 17/42; G01S 13/88; G01S 13/04; G01S 1/02; G01S 7/527; G01S 19/42; G01S 3/02; G01S 7/28; G01S 7/523; G01S 7/32
  See application file for complete search history.

(56) References Cited

FOREIGN PATENT DOCUMENTS

| | | |
|---|---|---|
| JP | 2014-071026 A | 4/2014 |
| JP | 2015-194356 | 11/2015 |
| WO | WO 2013/073071 A1 | 5/2013 |

OTHER PUBLICATIONS

Japan Patent Application No. 2019-558899; Notice of Reasons for Refusal; dated Sep. 1, 2022; 4 pages.

\* cited by examiner

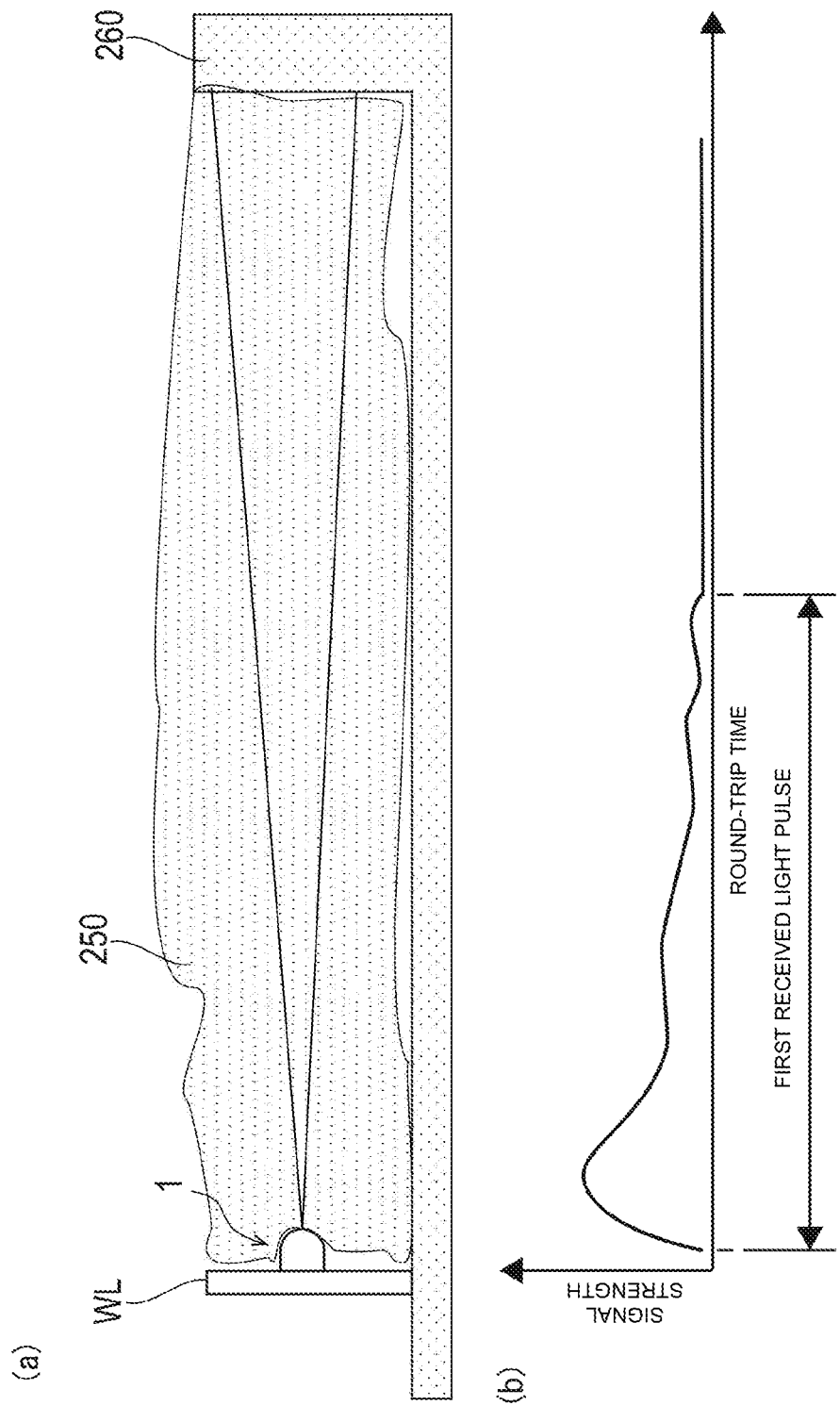

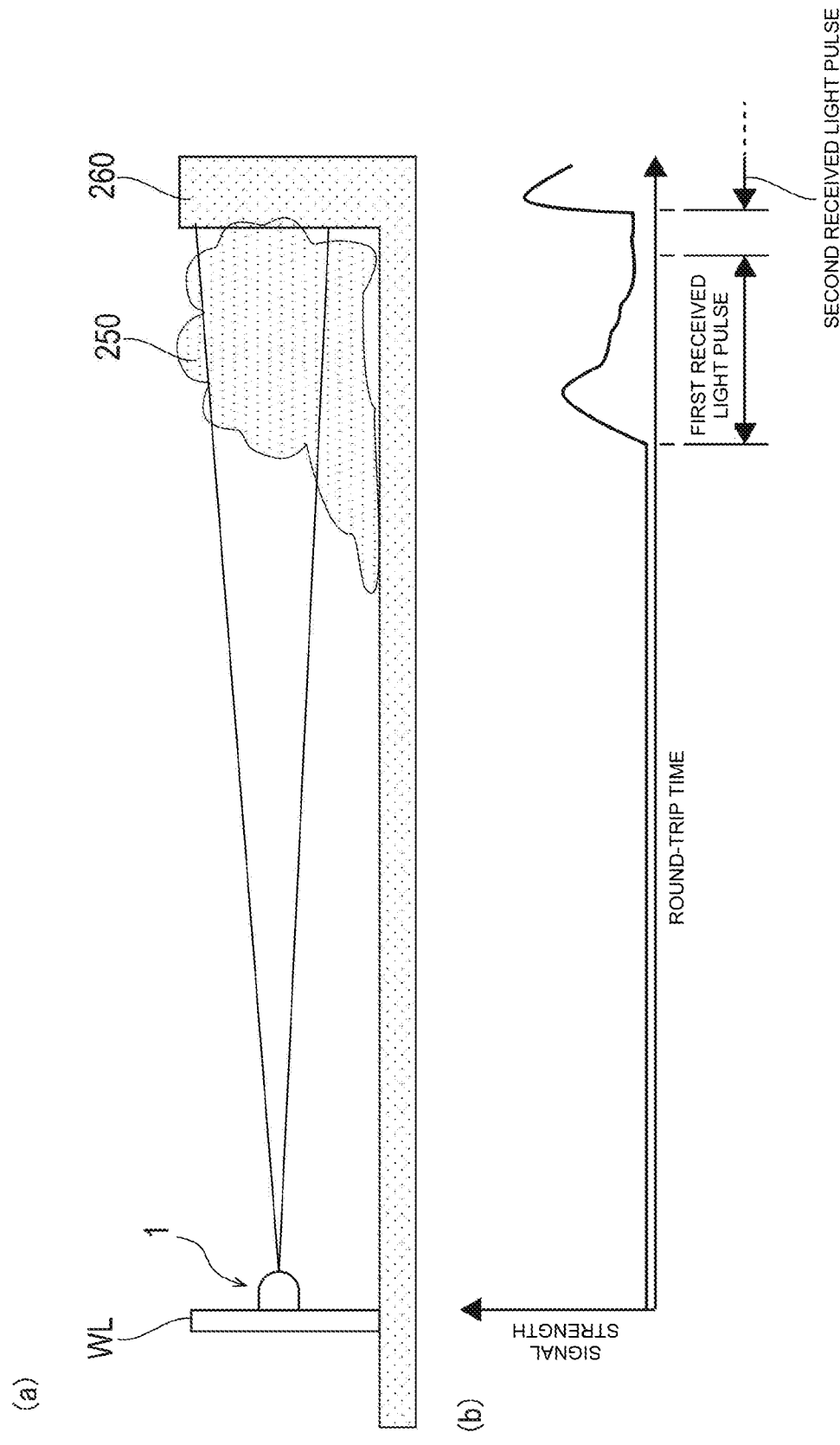

DISTANCE MEASURING DEVICE, CONTROL METHOD OF DISTANCE MEASURING DEVICE, AND CONTROL PROGRAM OF DISTANCE MEASURING DEVICE

The present U.S. Patent Application is U.S. National Phase Application under 35 U.S.C. 371 of International Application PCT/JP2018/031797 filed on Aug. 28, 2018, which claims a priority under the Paris Convention to Japanese Patent Application No. 2017-240435 filed on Dec. 15, 2017, the entire disclosures of which are incorporated herein by reference in their entireties.

TECHNICAL FIELD

The present invention relates to a distance measuring device, a control method of a distance measuring device, and a control program of a distance measuring device.

BACKGROUND ART

One distance measuring device is a device that transmits laser light toward a space, and measures the distance to an object in the space from the time from the transmission to the reception of light reflected by the object. One such device using a laser is a laser radar. A laser radar is also referred to as LiDER (Light Detection and Ranging, or Laser Imaging Detection and Ranging).

In such a distance measuring device, reflections from fog in a foggy environment may be measured as reflections from an object and be misrecognized as though an object is present.

Conventionally, to solve such a problem, the adoption of an object measured far away treated as an actually existing object as distance measurement data by multi-echo distance measurement, or in consideration of a case in which a received light pulse due to fog and the like during multi-echo acquisition and a received light pulse of an object cannot be separated by a comparator, a distance measuring device that selectively adopts a received light pulse, have been proposed (Japanese Unexamined Patent Application Publication No. 2015-194356).

The distance measuring device disclosed in Japanese Unexamined Patent Application Publication No. 2015-194356 is installed onboard an automobile. The distance measuring device outputs transmission waves around the automobile, and receives reflection waves of the transmission waves. Additionally, the time during which the amplitude of the received reflection waves exceeds a first threshold value and the time during which a second threshold value greater than the first threshold value is exceeded are measured to estimate the distance to the reflected object. At this time, the second threshold value is set higher than a clutter amplitude value in a poor environment, and the distance to the measurement target object is estimated on the basis of the first threshold value and the second threshold value.

SUMMARY OF INVENTION

However, in the conventional distance measuring device disclosed in Japanese Unexamined Patent Application Publication No. 2015-194356, in the case where a first wave is reflected light from fog or the like and no other reflected light is obtained, the reflected light from fog or the like is ultimately adopted. For this reason, the conventional distance measuring device is problematic in that measured fog or the like is mistakenly recognized as an object.

The present invention has been devised in light of the above circumstances; and an object of the present invention is to provide a distance measuring device capable of distinguishing between a reflection from fog or the like and a reflection from an actually existing object more accurately in an environment such as fog.

In addition, another object of the present invention is to provide a method of controlling a distance measuring device capable of distinguishing between a reflection from fog or the like and a reflection from an actually existing object more accurately in an environment such as fog.

Further, another object of the present invention is to provide a control program of a distance measuring device capable of distinguishing between a reflection from fog or the like and a reflection from an actually existing object more accurately in an environment such as fog.

The above object of the present invention can be achieved by the means below:

(1) A distance measuring device including:
a transmission element that transmits a signal:
a reception element that receives a signal transmitted by the transmission element and reflected by an object, and outputs a reception signal corresponding to a received signal strength:
a comparator that outputs a first signal equal to or greater than a first threshold value with respect to signal strength and a second signal equal to or greater than a second threshold value higher than the first threshold value from the reception signal; and
a signal processing unit that distinguishes the reception signal as valid or invalid from a relationship between a first time span from when the first signal becomes equal to or greater than the first threshold value until the first signal becomes less than the first threshold value and a second time span from when the second signal becomes equal to or greater than the second threshold value until the second signal becomes less than the second threshold value.

(2) The distance measuring device according to (1), in which the signal processing unit plots a point according to the first time span and the second time span in a two-dimensional orthogonal coordinate system treating a first axis as a time span direction of the first signal and a second axis as a time span direction of the second signal, distinguishes the reception signal as valid in a case where a position of the point is on a first axis side with respect to a threshold line according to a predetermined simply increasing function drawn in the orthogonal coordinate system, and distinguishes the reception signal as invalid in a case where the position of the point is on a second axis side.

(3) The distance measuring device according to (1) or (2), in which the signal processing unit computes a distance to the object from a time when the transmission element transmits the signal and a time when the reception element receives the signal, and distinguishes the distance as valid if the reception signal for which the distance is computed is distinguished as valid, and distinguishes the distance as invalid if the reception signal for which the distance is computed is distinguished as invalid.

(4) The distance measuring device according to (3), in which the signal processing unit distinguishes the computed distance as invalid in a case where the computed distance is less than a first predetermined value.

(5) The distance measuring device according to (3), further including:

a memory unit that stores background information including information about a distance to an object existing in a background, in which the signal processing unit distinguishes the computed distance as invalid in a case where a difference between the distance to an object existing in the background information stored in the memory unit and the computed distance is less than a second predetermined value.

(6) The distance measuring device according to (5), in which the signal processing unit excludes an invalidated distance from the background information in a ease where an invalidated distance exists among distances measured for storing the background information in the memory unit.

(7) The distance measuring device according to (3) or (4), further including:

a memory unit that stores background information including information about a distance to an object existing in a background, in which the signal processing unit excludes an invalidated distance from the background information in a case where an invalidated distance exists among distances measured for storing the background information in the memory unit.

(8) The distance measuring device according to any one of claims (3) to (5), in which the signal processing unit counts a number of times the distance is distinguished as invalid, and outputs an error signal in a case where a count value becomes equal to or greater than a predetermined value within a fixed period.

(9) A control method of a distance measuring device, the measuring device including a transmission element that transmits a signal, and a reception element that receives a signal transmitted by the transmission element and reflected by an object, and outputs a reception signal corresponding to, a received signal strength, the control method of a distance measuring device including:

a step (a) of outputting a first signal equal to or greater than a first threshold value with respect to signal strength and a second signal equal to or greater than a second threshold value higher than the first threshold value from the reception signal; and a step (b) of distinguishing the reception signal as valid or invalid or not from a relationship between a first time span from when the first signal becomes equal to or greater than the first threshold value until the first signal becomes less than the first threshold value and a second time span from when the second signal becomes equal to or greater than the second threshold value until the second signal becomes less than the second threshold value.

(10) The control method of a distance measuring device according to (9), in which the step (b) plots a point according to the first time span and the second time span in a two-dimensional orthogonal coordinate system treating a first axis as a time span direction of the first signal and a second axis as a time span direction of the second signal, distinguishes the reception signal as valid in a case where a position of the point is on a first axis side with respect to a threshold line according to a predetermined simply increasing function drawn in the orthogonal coordinate system, and distinguishes the reception signal as invalid in a case where the position of the point is on a second axis side.

(11) The control method of a distance measuring device according to (9) or (10), further including:

a step (c) of computing a distance to the object from a time when the transmission element transmits the signal and a time when the reception element receives the signal; and a step (d) of distinguishing the distance as valid if the reception signal for which the distance is computed in step (c) is distinguished as valid in step (b), and distinguishing the distance as invalid if the reception signal for which the distance is computed is distinguished as invalid.

(12) The control method of a distance measuring device according to (11), further including: a step (f) of distinguishing the distance computed in step (c) as invalid in a case where the computed distance is less than a first predetermined value.

(13) The control method of a distance measuring device according to (11), in which the distance measuring device includes a memory unit that stores background information including information about a distance to an object existing in a background, the control method further including:

a step (g) of distinguishing the computed distance as invalid in a case where a difference between the distance to an object existing in the background information and the computed distance is less than a second predetermined value.

(14) The control method of a distance measuring device according to (13), further including: a step (h) of excluding an invalidated distance from the background information in a case where an invalidated distance exists among distances measured for storing the background information in the memory unit.

(15) The control method of a distance measuring device according to (11) or (12), in which the distance measuring device includes a memory unit that stores background information including information about a distance to an object existing in a background, the control method further including:

a step (i) of excluding an invalidated distance from the background information in a case where an invalidated distance exists among distances measured for storing the background information in the memory unit.

(16) The control method of a distance measuring device according to any one of (11) to (13), further including: a step (j) of counting a number of times the distance is distinguished as invalid, and outputting an error signal in a case where a count value becomes equal to or greater than a predetermined value within a fixed period.

(17) A control program of a distance measuring device for causing the distance measuring device to execute the control method of a distance measuring device according to any one of (9) to (16).

(18) A computer-readable recording medium storing the control program according to (17).

BRIEF DESCRIPTION OF DRAWINGS

FIG. 5 is a graph illustrating a received light pulse from an actually existing object in a state with no fog or the like.

FIG. 6 is a graph illustrating a received light pulse from fog or the like.

FIG. 8 is an explanatory diagram that explains conditions of outdoor monitoring.

FIG. 9 is an explanatory diagram that explains conditions of outdoor monitoring.

DESCRIPTION OF EMBODIMENTS

Figure 1:
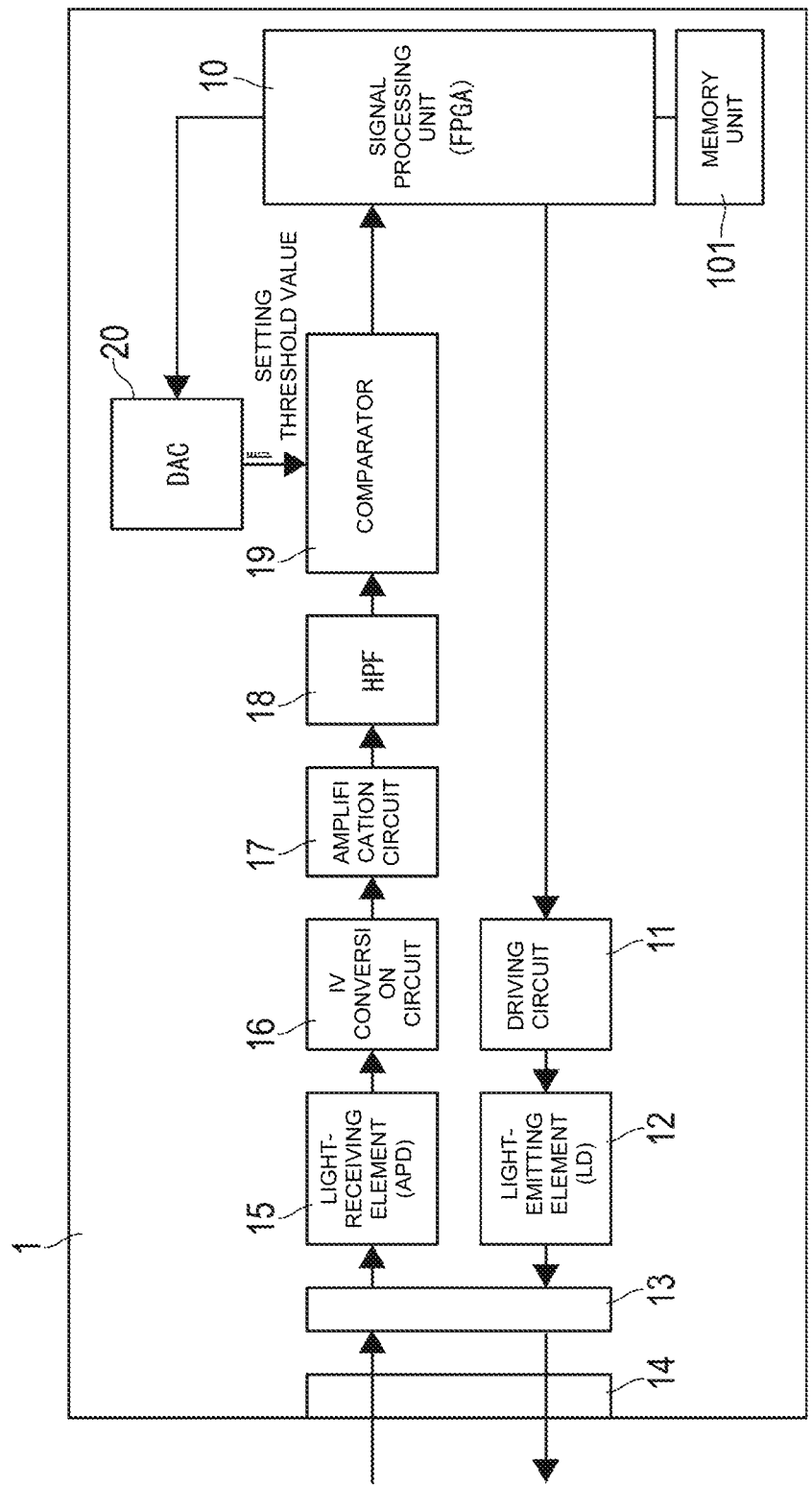
FIG. 1 is a block diagram illustrating a distance measuring device of the present embodiment.

Hereinafter, an embodiment of the present invention will be described in detail referring to the drawings. Note that in the description of drawings, the same reference sign is given to the same element, and duplicate explanations are omitted. Note that the dimension of the drawings is exaggerated for descriptive reasons and may be different from the actual dimension.

FIG. 1 is a block diagram illustrating a distance measuring device 1 of the present embodiment.

The distance measuring device 1 is provided with a signal processing unit 10, a driving circuit 11, a light-emitting element 12, optical components 13, a window 14, a light-receiving element 15, an IV conversion circuit 16, an amplification circuit 17, a HPF (High Pass Filter)) 18, a comparator 19, a DAC (Digital to Analog Converter) 20, and a memory unit 101.

The light-emitting element 12 (transmission element) uses a LD (Laser Diode). Following control by the signal processing unit 10, the driving circuit 11 applies a driving current to the light-emitting element 12, and the light-emitting element 12 emits a pulse to transmit a signal. The signal transmitted by the light-emitting element 12 is sent out externally through the optical components 13 such as a lens and a scan mirror, and also the window 14.

The light-receiving element 15 (reception element) uses an APD (Avalanche Photodiode). The light-receiving element 15 receives a signal radiated out from the light-emitting element 12 and reflected by an object, and outputs a reception signal corresponding to the received signal strength. The reception signal output by the light-receiving element 15 is converted into a voltage signal by the IV (current-voltage) conversion circuit 16, amplified by the amplification circuit 17, passes through the high-pass filter 18, and is input into the comparator 19. The high-pass filter 18 removes disturbances of lower frequency than the frequency of the signal.

The comparator 19 divides the reception signal according to two threshold values. The two threshold values are supplied from the DAC 20. The two threshold values are a first threshold value (low threshold value) and a second threshold value (high threshold value) that is higher, the details of which will be described later. The comparator 19 divides (classifies) the signal from the HPF 18 into a first signal (low signal) whose signal strength is equal to or greater than the first threshold value (low threshold value) and a second signal (high signal) equal to or greater than the second threshold value (high threshold value), and outputs to the signal processing unit 10. That is, if one received light pulse (reception signal) has a signal strength equal to or greater than the high threshold value, the comparator 19 outputs the low signal and the high signal. In other words, the low signal persists in time from when the signal strength exceeds the low threshold until the signal strength becomes less than the low threshold value, and the high signal persists in time from when the signal strength exceeds the high threshold value until the signal strength becomes less than the high threshold value. Note that the received light pulse refers to treating the rising start point to the falling end point of the received signal as a single received light pulse (see FIG. 3).

In the signal processing unit 10, an integrated circuit such as an FPGA (Field-Programmable Gate Array) is used. As is commonly known, an FPGA is a type of computer in which a program necessary for processing is already built in, and which executes predetermined processing at high speed. Herein, a control method of the distance measuring device 1 is built in as the computer program, and the distance to an object is computed according to the ToF (Time of Flight) method. Additionally, the signal processing unit 10 also performs a process of distinguishing between fog or the like and an object. The memory unit 101 is connected to the signal processing unit 10 and stores parameters, data, and the like necessary for processing. In the present embodiment, a first threshold value, a second threshold value, and a threshold line described later are stored as parameters. Other necessary values, formulas, and the like are also stored as parameters. In addition, the memory unit 101 stores necessary background information in the case of performing object detecting using background subtraction.

Note that the signal processing unit 10 may also be made to use a general-purpose computer using a CPU instead of an FPGA.

The signal processing unit 10 converts (binarizes) each of the low signal and the high signal from the comparator 19 into digital data (for example, 8-bit data). Here, the time span (first time span) from when the low signal becomes equal to or greater than the low threshold value until the low signal becomes less than the low threshold value is taken to be the pulse width of the low signal, and the time span (second time span) from when the high signal becomes equal to or greater than the high threshold value until the high signal becomes less than the high threshold value is taken to be the pulse width of the high signal. Consequently, the pulse width refers to the time span during which the signal strength of the signal (reception signal) received by the light-receiving element exceeds each threshold value. Obviously, this pulse width of the low signal and pulse width of the high signal may also be digitized to enable digital processing by the signal processing unit 10.

The signal processing unit 10 uses the digitized pulse width of the low signal and pulse width of the high signal to distinguish between fog or the like and an actually existing object.

Also, the signal processing unit 10 performs object detection using for example background subtraction or the like as necessary. In the case of performing object detection by background subtraction, information about the distance to an object that may act as the background when radiating laser light in the space to be irradiated with the laser light from the light-emitting element 12 is included as background information, for example. With background subtraction, the distance stored as the background information and the distance computed at the present time are compared (details described later).

Figure 2:
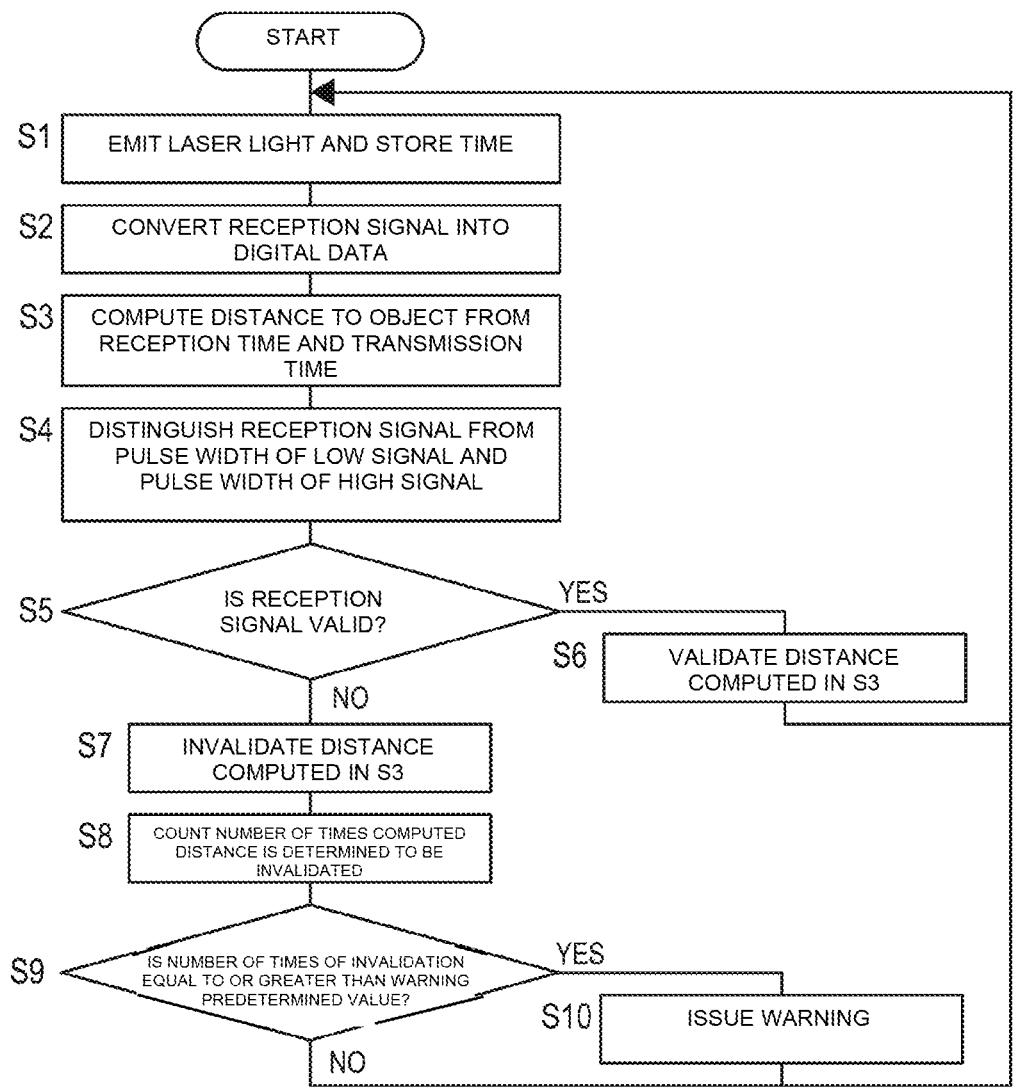
FIG. 2 is a flowchart illustrating a processing procedure of computing the distance to an object and also distinguishing between fog or the like and an actually existing object.

FIG. 2 is a flowchart illustrating a processing procedure of computing the distance to an object and also distinguishing between fog or the like and an actually existing object. This processing is performed by the signal processing unit 10.

First, the signal processing unit 10 outputs a control signal to the driving circuit 11, causing the light-emitting element 12 to emit a laser and transmit a signal, and stores the transmission time (S1).

Next, the signal processing unit 10 converts the low signal and the high signal from the comparator 19 into digital data (S2).

Next, the signal processing unit 10 computes the distance to the object according to the ToF method from the time of the reception signal and the time when the light-emitting element 12 transmitted (S3). Data of the computed distance is temporarily stored in the memory unit 101. As a specific process for distance computation by the signal processing unit 10, the distance to the object is computed on the basis of the time when the light-emitting element 12 transmitted the laser light (the time stored in S1) from the reception time of the low signal from the comparator 19. The reception time of the high signal by the signal processing unit 10 after passing through the comparator is substantially the time of light reception by the light-receiving element 15, although with an extremely slight delay inside the circuit. Note that the computation of the distance may use the reception time of the high signal rather than the reception time of the low signal, and the distance may also be computed using the signal before division by the comparator 19.

Next, the signal processing unit 10 distinguishes whether the reception signal is valid or invalid from the relationship between the pulse width of the low signal and the pulse width of the high signal (S4). This involves, for example, creating a two-dimensional orthogonal coordinate system treating a first axis as the time span direction of the low signal (first signal) and a second axis as the time span direction of the high signal (second signal), plotting a point in the orthogonal coordinate system using the values of the pulse width for each of the low signal and the high signal, and distinguishing valid data (a valid reception signal) in the case where the position of the point is closer to the first axis than a straight line having a predetermined positive slope (or an increasing curve). Details about this distinguishing method will be described later.

Next, if the result of S4 is that the reception signal is distinguished as valid (S5: YES), the signal processing unit 10 distinguishes the distance computed in S3 (S6) as valid. After that, the flow returns to S1, and the processing procedure is repeatedly executed.

On the other hand, if the result of S4 is that the reception signal is distinguished as invalid (S5: NO), the distance computed in S3 is invalidated (S7). In the invalid case, the data of the distance stored in the memory unit 101 may also be discarded.

After that, the signal processing unit 10 counts the number of times the computed distance is determined to be invalid (S8). For this count, in the case where three-dimensional distance data is obtained like with a three-dimensional laser radar (described later) for example, the number of times the distance is invalidated is counted at fixed intervals for example, or in other words within several frames to several hundred frames (or several thousand or several tens of thousands of frames) measured consecutively on a predetermined cycle (in this case the invalid determination does not have to be consecutive). In this case, if a predetermined number of frames has been reached, the count is reset at that time. Also, for example, with one-dimensional laser distance measurement, the number of times the distance is consecutively invalidated is counted. In this case, if the invalidated distances are interrupted, the count is reset at that time.

Next, the signal processing unit 10 determines whether or not the count value of the number of times the distance has been invalidated is equal to or greater than a predetermined value (referred to as the warning predetermined value (error predetermined value)) at which to produce a warning (error signal) (S9). The warning predetermined value is decided as follows, for example. In the case of a three-dimensional laser radar (described later), the distance measurement operation (the transmission and reception of laser light) is executed on 24 lines at 1000 points per line to form a single frame. Normally, operation is performed at 10 frames per second. In such a three-dimensional laser radar, if it is determined that the weather conditions are poor in the case where the distance is invalidated for a period of 600 frames (approximately 1 minute=60 seconds) for example, it is sufficient to set the warning predetermined value to 14,400,000 times (=1000 points×24 lines×600 frames). Obviously, the warning predetermined value may be any value, and a shorter period than the above is possible, or an even longer period is possible. Note that the warning operation does not have to be performed, and in this case, the process from S8 to S10 is not performed, and after the process in S7 the flow returns directly to S1 and the process is continued.

If the count value is not equal to or greater than the warning predetermined value (S9: NO), the flow returns directly to S1, and the processing procedure is repeatedly executed. On the other hand, if the count value is equal to or greater than the warning predetermined value (S9: YES), the signal processing unit 10 issues a warning (error signal) (S10). The warning in S10 gives notice that fog or the like is occurring and the weather conditions are conditions unsuited to measurement, for example. After that, the flow returns to S1, and the processing procedure is repeatedly executed.

Next, the method of distinguishing between data of fog or the like (invalid data) and data from an actually existing object (valid data) from the relationship between the pulse width of the low signal and the pulse width of the high signal described above will be described in detail.

Figure 3:
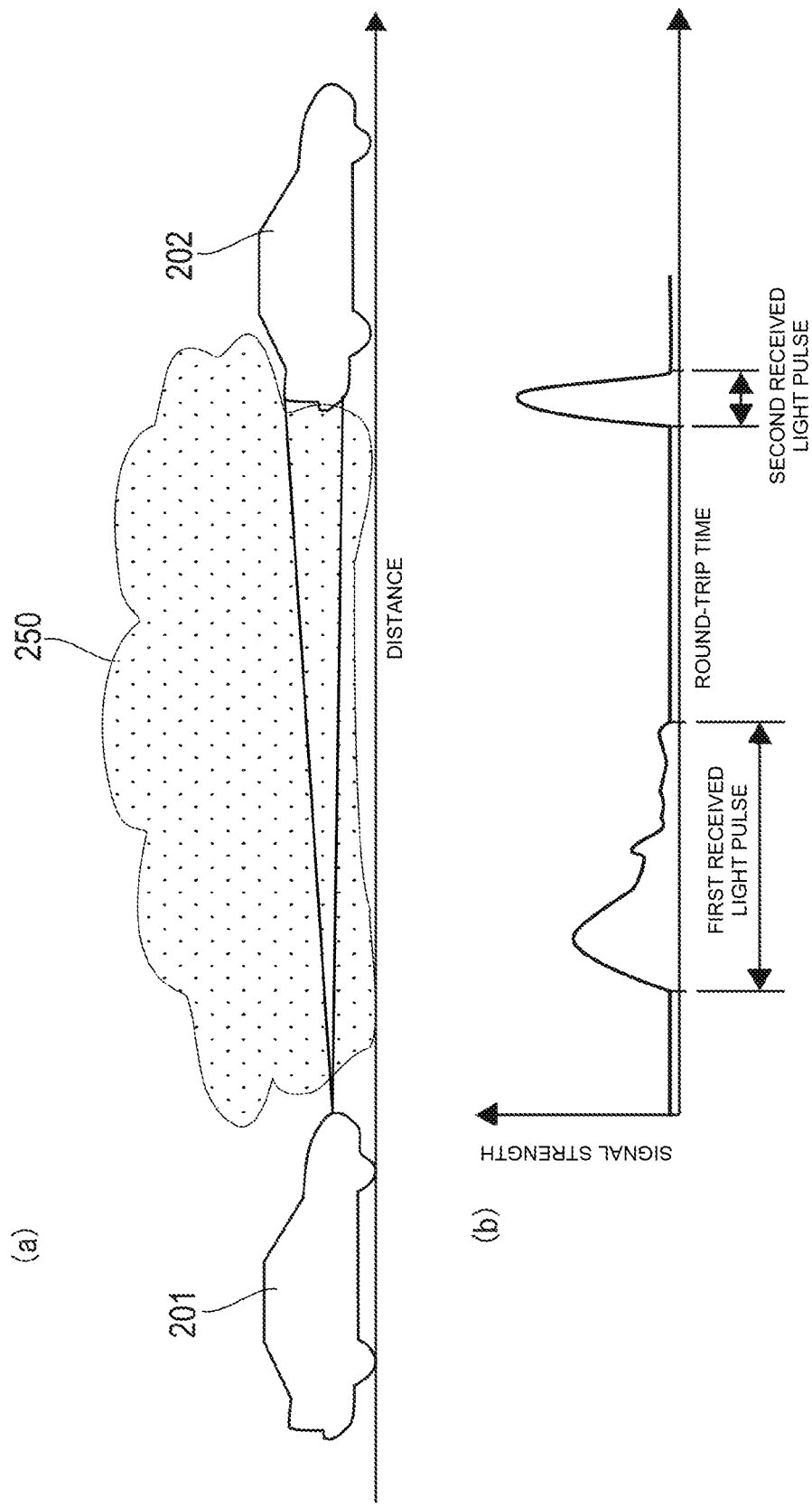
FIG. 3 is an explanatory diagram for explaining a state of measurement by the distance measuring device in a case where fog exists.

FIG. 3 is an explanatory diagram for explaining a state of measurement by the distance measuring device 1 in a case where fog exists. FIG. 3(a) is a diagram illustrating foggy conditions, and FIG. 3(b) is a diagram illustrating the relationship between received light strength and time corresponding to FIG. 3(a). FIG. 3 is an example in which the distance measuring device 1 is installed in an automobile (automobile 201).

In the conditions illustrated in FIG. 3(a), there is a leading vehicle 202 in front of the automobile 201, and furthermore, fog 250 is occurring. If the distance is measured by the distance measuring device 1 in such conditions, as illustrated in FIG. 3(b), two received light pulses appear in the received light strength (signal strength) with respect to laser light transmitted as a single pulse.

The first received light pulse is received light due to reflection from the fog 250. The second received light pulse is received light due to reflection from the leading vehicle 202.

In the conventional technology, when there is such a first received light pulse and a second received light pulse, the received light pulse from farther away, or in other words the received light pulse with a longer round-trip time, is recognized as the received light from an object.

Figure 4:
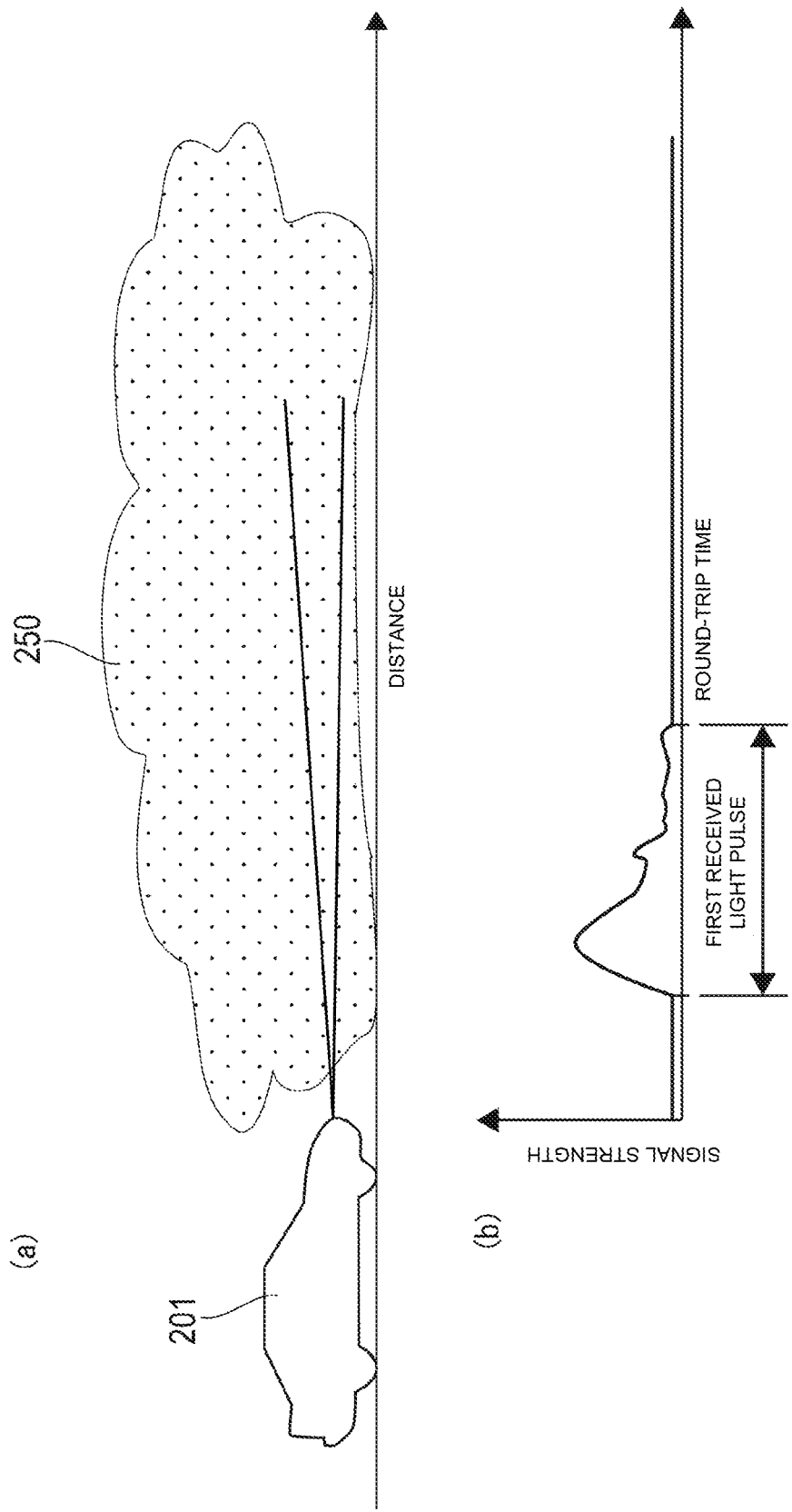
FIG. 4 is an explanatory diagram for explaining a case where there is no object beyond the fog.

FIG. 4 is an explanatory diagram for explaining a case where there is no object beyond the fog. FIG. 4(a) is a diagram illustrating foggy conditions, and FIG. 4(b) is a diagram illustrating the relationship between received light strength and time corresponding to FIG. 4(a).

In the conditions illustrated in FIG. 4(a), because the leading vehicle 202 is not present, only the first received light pulse that is the reflection from the fog 250 appears, as illustrated in FIG. 4(b). In such a case, there is no reflection from farther away (longer round-trip time) than the first received light pulse. For this reason, in the conventional technology, the existence of some kind of object is misrecognized at the reflection position of the first received light pulse that is the reflection from the fog 250.

Now referring to FIG. 3 again, a difference in the waveforms of the first received light pulse and the second received light pulse is demonstrated. The present embodiment focuses on such a difference in the waveforms of the first received light pulse reflected from the fog 250 and the second received light pulse reflected from an actually existing object to distinguish between the first received light pulse from the fog 250 and the second received light pulse from an object (leading vehicle 202).

Figure 5:
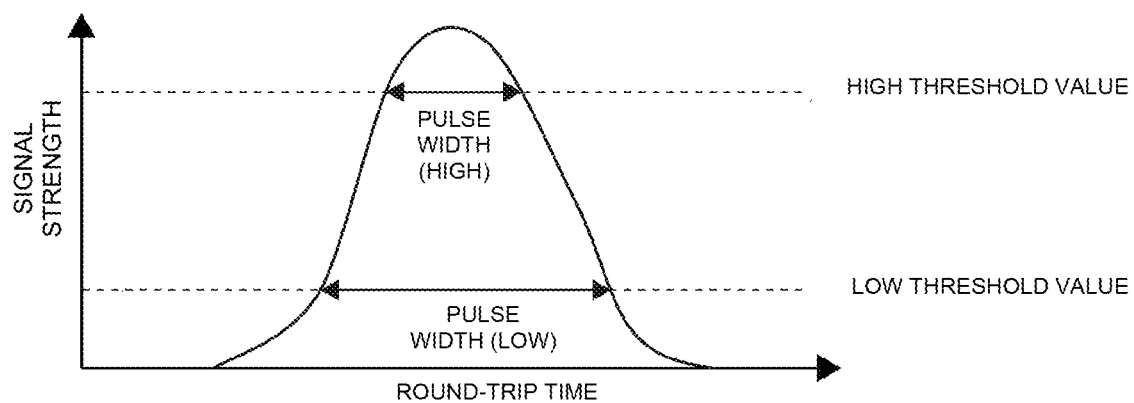
Figure 6:
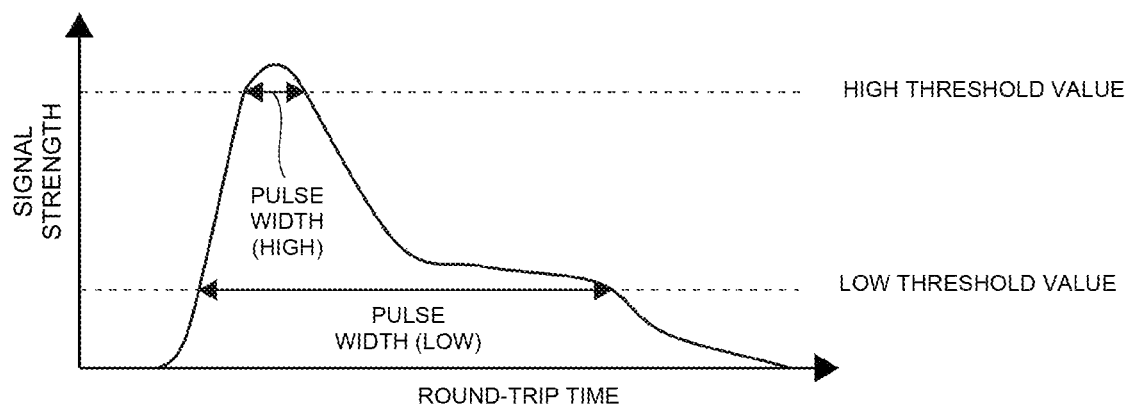

FIG. 5 is a graph illustrating a received light pulse from an actually existing object in a state with no fog or the like. FIG. 6 is a graph illustrating a received light pulse from fog or the like.

As illustrated in FIG. 5, for a received light pulse from an actually existing object in a state with no fog or the like, the waveform rises more sharply and falls more sharply than the received light pulse from fog or the like illustrated in FIG. 6. On the other hand, as illustrated in FIG. 6, the received light pulse from fog or the like is similar to the received light pulse from an actually existing object illustrated in FIG. 5 when rising, but the fall is drawn out in a lingering tail. Consequently, these graphs in FIGS. 5 and 6 demonstrate that the difference between a received light pulse from an actually existing object and a received light pulse from fog or the like is the presence of what is referred to as tailing in the waveform of the received light pulse waveform from fog or the like.

A received light pulse due to fog or the like is distinguished from such a difference in the waveforms. First, the low threshold value is set for the signal strength containing the tailing portion, while the high threshold value is set for the signal strength not containing the tailing portion. The times clipped by each of the threshold values are treated as the pulse widths.

Additionally, the pulse width clipped by the low threshold value and the pulse width clipped by the high threshold value for a single received light pulse are used to plot a point on a graph of a two-dimensional orthogonal coordinate system treating a first axis (horizontal axis) as the pulse width (time span) direction of the low signal (first signal) and a second axis (vertical axis) as the pulse width (time span) of the high signal (second signal).

Figure 7:
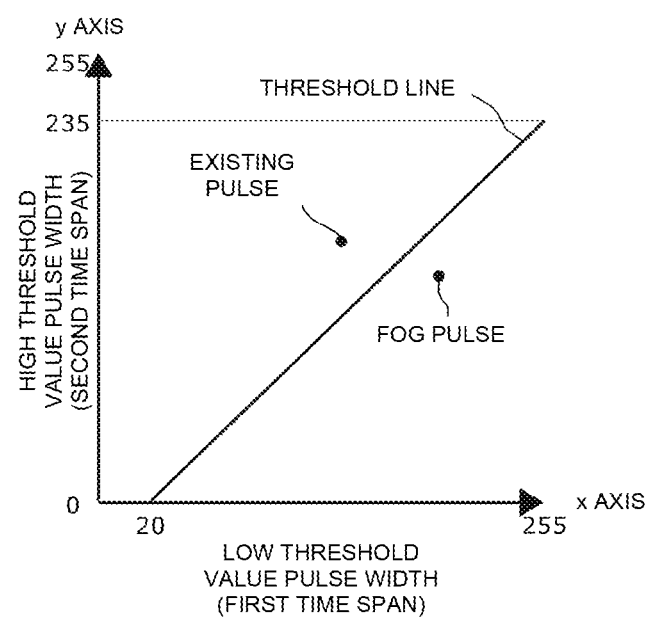
FIG. 7 is a graph illustrating a two-dimensional orthogonal coordinate system treating a first axis (horizontal axis) as the pulse width (time span) direction of a low signal (first signal) and a second axis (vertical axis) as the pulse width (time span) of a high signal (second signal).

FIG. 7 is a graph illustrating a two-dimensional orthogonal coordinate system treating a first axis (horizontal axis) as the pulse width (time span) direction of a low signal (first signal) and a second axis (vertical axis) as the pulse width (time span) of a high signal (second signal).

In the graph of FIG. 7, if a point is plotted according to the pulse widths respectively clipped by the low threshold value and the high threshold value for the received light pulse from an actually existing object illustrated in FIG. 5, the result is the position of the point illustrated as "real pulse" in FIG. 7. Similarly, if a point is plotted according to the pulse widths respectively clipped by the low threshold value and the high threshold value for the received light pulse from the fog, the result is the point illustrated as "fog pulse" in FIG. 7.

Additionally, in FIG. 7, a straight line separating the "real pulse" point and the "fog pulse" point is drawn. This straight line is the line of a first-order function having a positive slope, and is referred to as the "threshold line". The "real pulse" point is above the threshold line (on the second axis side), and the "fog pulse" point is below the threshold line (on the first axis side). Consequently, depending on whether a received light pulse is above or below the threshold line, it is possible to distinguish whether the received light pulse is a reflection from an actually existing object or a reflection from fog or the like.

The process by the signal processing unit 10 predefines a function that serves as the threshold line in an orthogonal coordinate system treating a first axis as the x-axis and a second axis as the y-axis (draws the threshold line on the graph), for example. In the illustration in FIG. 7, the function is $y=ax-20$. This function computes the value of y, treating x=pulse width of the low signal (first time span). If the computed value of y and the pulse width of the high signal (second time span) are compared and (computed y value)< (pulse width of high signal (second time span)), the received light pulse (reception signal) is distinguished as valid data. Note such a first-order function is merely an illustrative example, and the present invention is not limited to using such a first-order function.

Such a threshold line is set by experiment in advance to a position that separates received light pulses reflected from actually existing objects and received light pulses reflected from fog or the like. For the threshold line illustrated in FIG. 7, in actuality, points are plotted on the graph the above orthogonal coordinate system according to received light pulses respectively obtained for an actually existing object in conditions with no fog or the like and conditions with fog (no object), and the pulse widths according to the low threshold value and the high threshold value for several thousand pulses, and a threshold line separating actually existing objects and fog is derived. Note that conditions with fog are times of weather conditions when a dense fog warning is issued (effective visibility is less than 100 m).

The threshold line herein is the straight line of a first-order function, but in some cases is a simply increasing function such as a second-order function or a third-order function rather than a straight line as a result of many experiments. Additionally, experiments may also be performed in conditions other than fog, such as rain and snow, and threshold lines that distinguish between reflections from these and reflections from objects may also be computed.

By using such a distinguishing method, in the case where the leading vehicle 202 exists beyond the fog 250 as viewed from the automobile 201 (that is, the distance measuring device 1) illustrated in FIG. 3, the reflection from the leading vehicle 202 can be distinguished to compute the distance thereto. Also, as illustrated in FIG. 4, in the case where nothing exists beyond the fog 250 as viewed from the automobile 201 (that is, the distance measuring device 1), the reflection from the fog 250 does not become valid (becomes the fog pulse point in FIG. 7), and therefore the reflection from the fog 250 is not misrecognized as an object.

Next, object detection using background subtraction will be described. As is commonly known, background subtraction is an object detection method that compares a distance included in background information stored in advance to a newly acquired (computed) distance, and if a difference exists between them, it is detected that an object has newly appeared.

Object detection using background subtraction according to the present embodiment is performed as follows.

In the case of performing object detection by background subtraction, the signal processing unit 10 performs the computation of distance according to the processing procedure described above to store background information in the memory unit 101.

The signal processing unit 10 stores the obtained distance to an object existing in the background (or that an object does not exist) in the memory unit 101 as the background information. Note that in the range where an object does not exist, the distance is stored as infinity. After that, if there is a difference between a new distance acquired from moment to moment and the distance included in the background information, it is detected that an object that did not exist in the background has appeared.

Here, when acquiring the background information, fog or the like may sometimes occur. In such cases, the distances according to reception signals reflected by fog or the like have so far been stored directly as background information.

In the present embodiment, when acquiring and storing background information in the memory unit 101, the distance is distinguished as valid or invalid by the processing procedure described above. With this arrangement, in conditions where fog or the like is occurring, the distance to the fog or the like becomes invalid, and therefore such an invalidated distance is excluded from the background information and is not stored. With this arrangement, it is possible to prevent distances computed by the reflection from fog or the like from being included in the background information and stored.

Note that in the case where an invalidated distance is excluded from the background information, such as in the case where there is a validated distance farther away from the excluded distance, for example, the validated distance is stored as the background information. On the other hand, in the case where there is no validated distance farther away than the excluded distance, at the timing of updating the background information, the background information previously stored in the memory unit 101 is used without being updated. In cases other than the timing of updating the background information (such as in the case where there is no stored background information or when acquiring background information for the first time), for example, a caution or the like indicating that there is no valid distance to treat as background information may be issued.

Meanwhile, in the case of using the distance measuring device 1 for spatial monitoring outdoors, various things may occur depending on the conditions in the space being monitored.

FIG. 8 is an explanatory diagram that explains conditions of outdoor monitoring. FIG. 8(*a*) is a diagram illustrating foggy conditions, and FIG. 8(*b*) is a diagram illustrating the relationship between received light strength and time corresponding to FIG. 8(*a*).

In the outdoor monitoring illustrated in FIG. 8, the distance measuring device 1 is attached to a wall WL and an enclosure 260 exists inside the monitored space.

FIG. 8(*a*) illustrates conditions in which thick fog that clings to the distance measuring device 1 is occurring. Although dependent on the thickness of the fog, such a case results in a state in which the overall received light pulse becomes a gently sloping shape and the laser light does not reach far, as illustrated in FIG. 8(*b*). In such conditions, with the distinguishing according to the first threshold value and the second threshold value, data from the fog may be treated as valid in some cases.

Accordingly, in the present embodiment, in the case where the distance treated as valid is less than a first predetermined value from the distance measuring device 1, the distance is distinguished as invalid. Note that the number of times that the computed distance is invalidated by the distance from the distance measuring device 1 in this way may also be treated as the counting target of S8 in the processing procedure described above.

Additionally, a distance invalidated by the first predetermined value in this way is also excluded from the background information to use for background subtraction. The process in the case where an invalidated distance is excluded from the background information is as described earlier.

The first predetermined value is different depending on the state inside the monitored space, such as the extent of the monitored space and the shape of the enclosure; but for example, the measured distance is invalidated in the case of being less than 1 m from the distance measuring device 1.

FIG. 9 is an explanatory diagram that explains conditions of outdoor monitoring. FIG. 9(*a*) is a diagram illustrating foggy conditions, and FIG. 9(*b*) is a diagram illustrating the relationship between received light strength and time corresponding to FIG. 9(*a*).

FIG. 9(*a*) illustrates conditions in which the fog 250 hangs over near the enclosure 260. In such conditions, as illustrated in FIG. 9(*b*), the received light pulse of the reception signal has tailing as the reflection from the fog, but since beyond the fog is the enclosure 260, the tailing is not very long. In such conditions, with the distinguishing according to the first threshold value and the second threshold value, data from the fog may be treated as valid in some cases.

Accordingly, in the present embodiment, in a monitored space where such the enclosure 260 exists, a distance treated as valid is invalidated in the case where the distance is less than a second predetermined value as the distance from the enclosure 260. In other words, in the case where the difference between the distance to an object existing in the background and a newly computed distance is less than a second predetermined value, the computed distance is invalidated (invalid when (distance to the enclosure 260−computed distance)<second predetermined value). Note that the number of times that the computed distance is invalidated by the distance from the enclosure 260 in this way may also be treated as the counting target of S8 in the processing procedure described above.

The second predetermined value is different depending on the state inside the monitored space, such as the extent of the monitored space and the shape of the enclosure, but for example, if the maximum distance of the monitored space is about 20 to 40 m, in the case of being less than 5 m from the enclosure 260, the distance is invalidated. The distance to the enclosure 260 is stored in the memory unit 101 as background information in advance.

A distance invalidated by the second predetermined value in this way is also excluded from the background information to use for background subtraction. The process in the case where an invalidated distance is excluded from the background information is as described earlier.

The distance measuring device 1 of the present embodiment is suited to a three-dimensional laser radar, for example. As is commonly known, a three-dimensional laser radar transmits laser light toward a space while scanning, and measures the distance to an object in the space from the time from the transmission time to the reception time of the reflected light. By performing the above directed at a three-dimensional space, a three-dimensional image according to the measured distances is obtained. Such an image is referred to as a distance image. A laser radar is sometimes referred to as LiDER (Light Detection and Ranging, or Laser Imaging Detection and Ranging).

By utilizing the distance measuring device 1 of the present embodiment in a three-dimensional laser radar, it is possible to tell the difference between fog or the like occurring in the measured space and actually existing objects.

As described above, the present embodiment divides a received light pulse (reception signal) received by a light-receiving element according to a low threshold value (first threshold value) and a high threshold value (second threshold value) with respect to the signal strength. In other words, the received light pulse is divided (classified) into a first signal (low signal) equal to or greater than the first threshold value (low threshold value) and a second signal (high signal) equal to or greater than the second threshold value (high threshold value). Additionally, from the relationship of the pulse width (time span) for each of the threshold values, the received light is distinguished between reflected light from fog or the like and reflected light from an actually existing object. With this arrangement, it becomes possible to tell the difference from fog or the like from only the reception signal due to reflection from fog or the like. Consequently, even in the case where there is not actually existing object beyond the fog or the like, it is possible to prevent the misrecognition (or reduce the misrecognition) of a reflection from the fog or the like as an object.

In addition, the occurrence of fog or the like can also be detected without performing distance measurement using the distance measuring device 1 of the present embodiment. In this case, it is sufficient to omit S3 in the processing procedure described above, and issue a warning (error signal) or the like in the case where the reception signal is invalid (S5: NO). With this arrangement, the distance measuring device 1 can be used as a weather information detection device or the like in a limited space or the like.

The control program of a distance measuring device according to the present invention can be realized by a dedicated hardware circuit. Further, this control program can be provided by a computer-readable recording medium, such as a USB (universal serial bus) memory, a DVD (digital versatile disc)-ROM (read only memory), or can be provided online via a network such as the internet without using a recording medium. In this case, this control program is usually stored in a magnetic disk drive and the like that constitutes a memory unit. Further, this control program can be provided as a single application software, or can be installed in another software as one function to be provided.

The embodiments to which the present invention is applied have been described above, however, the present invention is not limited to these embodiments. The present invention can be modified in various ways on the basis of the configurations described in the claims, and these modifications are also included in the scope of the present invention.

The present application is based on Japanese patent application No. 2017-240435 filed on Dec. 15, 2017, and a disclosed content thereof is incorporated herein as a whole by reference.

REFERENCE SIGNS LIST

1 Distance measuring device
10 Signal processing unit
11 Driving circuit
12 Light-emitting element (transmission element)
13 Optical component
14 Window
15 Light-receiving element (reception element)
16 IV conversion circuit
17 Amplification circuit
18 High-pass filter
19 Comparator
20 DA Converter
101 Memory unit

The invention claimed is:

1. A distance measuring device comprising:
a transmission element that transmits a signal;
a reception element that receives a signal transmitted by the transmission element and reflected by an object, and outputs a reception signal corresponding to a received signal strength;
a comparator that divides the reception signal into a first signal equal to or greater than a first threshold value with respect to signal strength and a second signal equal to or greater than a second threshold value, wherein the second threshold value is higher than the first threshold value; and
a hardware processor that compares a first pulse width of the first signal and a second pulse width of the second signal and distinguishes the reception signal as valid or invalid based on said comparison.

2. The distance measuring device according to claim 1, wherein the hardware processor plots a point according to a first time span from when the first signal becomes equal to or greater than the first threshold value and a second time span from when the second signal becomes equal to or greater than the second threshold value in a two-dimensional orthogonal coordinate system treating a first axis as a time span direction of the first signal and a second axis as a time span direction of the second signal, distinguishes the reception signal as valid in a case where a position of the point is on a first axis side with respect to a threshold line according to a predetermined simply increasing function drawn in the orthogonal coordinate system, and distinguishes the reception signal as invalid in a case where the position of the point is on a second axis side.

3. The distance measuring device according to claim 1, wherein the hardware processor computes a distance to the object from a time when the transmission element transmits the signal and a time when the reception element receives the signal, and distinguishes the distance as valid if the reception signal for which the distance is computed is distinguished as valid, and distinguishes the distance as invalid if the reception signal for which the distance is computed is distinguished as invalid.

4. The distance measuring device according to claim 3, wherein the hardware processor distinguishes the computed distance as invalid in a case where the computed distance is less than a first predetermined value.

5. The distance measuring device according to claim 3, further comprising:
a memory unit that stores background information including information about a distance to an object existing in a background, wherein
the hardware processor distinguishes the computed distance as invalid in a case where a difference between the distance to an object existing in the background information stored in the memory unit and the computed distance is less than a second predetermined value.

6. The distance measuring device according to claim 5, wherein the hardware processor excludes an invalidated distance from the background information.

7. The distance measuring device according to claim 3, further comprising:

a memory unit that stores background information including information about a distance to an object existing in a background, wherein
the hardware processor excludes an invalidated distance from the background information.

8. The distance measuring device according to claim 3, wherein the hardware processor counts a number of times the distance is distinguished as invalid, and outputs an error signal in a case where a count value becomes equal to or greater than a predetermined value within a fixed period.

9. A method comprising;
transmitting, by a transmission element, a signal;
receiving, by a reception element, the signal transmitted by the transmission element and reflected by an object;
outputting a reception signal corresponding to a signal strength of the received signal;
dividing the reception signal into a first signal equal to or greater than a first threshold value with respect to signal strength and a second signal equal to or greater than a second threshold value, wherein the second threshold value is higher than the first threshold value;
comparing a first pulse width of the first signal and a second pulse width of the second signal; and
distinguishing the reception signal as valid or invalid based on said comparison.

10. The method according to claim 9, further comprising plotting to a point according to a first time span from when the first signal becomes equal to or greater than the first threshold value and a second time span from when the second signal becomes equal to or greater than the second threshold value in a two-dimensional orthogonal coordinate system treating a first axis as a time span direction of the first signal and a second axis as a time span direction of the second signal, distinguishes the reception signal as valid in a case where a position of the point is on a first axis side with respect to a threshold line according to a predetermined simply increasing function drawn in the orthogonal coordinate system, and distinguishes the reception signal as invalid in a case where the position of the point is on a second axis side.

11. The method according to claim 9, further comprising:
computing a distance to the object from a time when the transmission element transmits the signal and a time when the reception element receives the signal; and
distinguishing the distance as valid if the reception signal for which the distance is computed is distinguished as valid, and distinguishing the distance as invalid if the reception signal for which the distance is computed is distinguished as invalid.

12. The method according to claim 11, further comprising:
distinguishing the distance as invalid in a case where the computed distance is less than a first predetermined value.

13. The method according to claim 11, further comprising:
storing, by a memory unit, background information including information about a distance to an object existing in a background; and
distinguishing the distance as invalid in a case where a difference between the distance to an object existing in the background information and the distance is less than a second predetermined value.

14. The method according to claim 13, further comprising: excluding an invalidated distance from the background information.

15. The method according to claim 11, further comprising:
storing, by a memory unit, background information including information about a distance to an object existing in a background; and
excluding an invalidated distance from the background information.

16. The method according to claim 11, further comprising: counting a number of times the distance is distinguished as invalid, and outputting an error signal in a case where a count value becomes equal to or greater than a predetermined value within a fixed period.

17. A non-transitory computer program product comprising:
a non-transitory computer-readable storage medium; and
instructions stored on the non-transitory computer-readable storage medium that, when executed by a processor, causes the processor to:
transmit, by a transmission element, a signal;
receive, by a reception element, the signal transmitted by the transmission element and reflected by an object;
output, by the reception element, a reception signal corresponding to a signal strength of the received signal;
divide the reception signal into a first signal equal to or greater than a first threshold value with respect to signal strength and a second signal equal to or greater than a second threshold value, wherein the second threshold value is higher than the first threshold value;
compare a first pulse width of the first signal and a second pulse width of the second signal; and
distinguish the reception signal as valid or invalid based on said comparison.

* * * * *